(12) United States Patent
Sohn et al.

(10) Patent No.: US 12,431,526 B2
(45) Date of Patent: Sep. 30, 2025

(54) CORE FOR ASSEMBLING CROSS MEMBER OF BATTERY CASE AND CORE MOUNTING JIG

(71) Applicant: SUNGWOO HITECH CO., LTD., Busan (KR)

(72) Inventors: Sung Man Sohn, Yangsan-si (KR); Youngrock Song, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 598 days.

(21) Appl. No.: 17/813,673

(22) Filed: Jul. 20, 2022

(65) Prior Publication Data

US 2023/0223632 A1  Jul. 13, 2023

(30) Foreign Application Priority Data

Jan. 7, 2022 (KR) .................. 10-2022-0002597

(51) Int. Cl.
| | |
|---|---|
| *H01M 10/04* | (2006.01) |
| *B23K 37/04* | (2006.01) |
| *B60K 1/04* | (2019.01) |
| *B60L 50/64* | (2019.01) |
| *H01M 50/204* | (2021.01) |
| *H01M 50/244* | (2021.01) |

(Continued)

(52) U.S. Cl.
CPC ..... *H01M 10/0404* (2013.01); *B23K 37/0443* (2013.01); *B60L 50/64* (2019.02); *H01M 50/204* (2021.01); *H01M 50/244* (2021.01); *H01M 50/264* (2021.01); *H01M 50/249* (2021.01)

(58) Field of Classification Search
None
See application file for complete search history.

(56) References Cited

U.S. PATENT DOCUMENTS

| 4,472,702 A | 9/1984 | Johansson et al. |
|---|---|---|
| 2023/0223577 A1* | 7/2023 | Sohn ............ H01M 50/204 29/730 |

FOREIGN PATENT DOCUMENTS

| CN | 109311130 A | * 2/2019 | ............ B23K 26/21 |
|---|---|---|---|
| CN | 109332991 | 2/2019 | |

(Continued)

OTHER PUBLICATIONS

Machine Translation of CN-109311130-A (Year: 2019).*

*Primary Examiner* — Gregg Cantelmo
(74) *Attorney, Agent, or Firm* — LEX IP MEISTER, PLLC

(57) ABSTRACT

Disclosed is a core for assembling a cross member of a battery case. A core for assembling a cross member of a battery case is insertable into a closed section in a longitudinal direction of the cross member to laser-weld at least one part to be assembled to the cross member of the battery case with the closed section. The core may include: a first core block made of steel, which includes a first slip surface formed at one side in a width direction to be inclined in a direction toward the other side; a second core block made of the steel, which includes a second slip surface formed to be inclined at the one side in the width direction to slip on the corresponding first slip surface in an upper and lower direction; a plurality of first magnet members installed on one surface of the first core block; and a plurality of second magnet members installed on one surface of the second core block facing the one surface of the first core block.

19 Claims, 11 Drawing Sheets

(51) Int. Cl.
*H01M 50/249* (2021.01)
*H01M 50/264* (2021.01)

(56) References Cited

FOREIGN PATENT DOCUMENTS

| | | |
|---|---|---|
| DE | 3212677 | 11/1982 |
| DE | 102014100114 | 7/2015 |
| DE | 102016101174 | 7/2017 |
| JP | H02116444 | 5/1990 |
| KR | 10-2017-0076383 | 7/2017 |
| KR | 10-2251094 | 5/2021 |
| KR | 10-2021-0080740 | 7/2021 |

\* cited by examiner (a)

(b)

(a)

(b)

(c)

CORE FOR ASSEMBLING CROSS MEMBER OF BATTERY CASE AND CORE MOUNTING JIG

CROSS-REFERENCE TO RELATED APPLICATION

This application claims priority to and the benefit of Korean Patent Application No. 10-2022-0002597 filed in the Korean Intellectual Property Office on Jan. 7, 2022, the entire contents of which are incorporated herein by reference.

BACKGROUND OF THE INVENTION

(a) Field of the Invention

The present invention relates to an assembly system of a battery case for an electric vehicle, and more particularly, to a core for assembling a cross member mounted on a battery case and a core mounting jig.

(b) Description of the Related Art

Recently, the development of electric vehicles has been steadily conducted due to environmental pollution problems and efforts to develop alternative energy.

The electric vehicle is equipped with an electric motor (drive motor) for driving a vehicle and a high voltage battery pack that supplies power to the electric motor. The high voltage battery pack is an energy source that drives the electric motor and supplies the power of high voltage to the electric motor through an inverter.

The battery pack is generally mounted on a lower portion of a vehicle body. The battery pack includes a battery case having an internal space, a plurality of battery modules installed in the internal space of the battery case, and a cover covering the battery case.

Here, a plurality of cross members is mounted on a floor surface of the battery case, which is configured to partition a mounting region of the plurality of battery modules. For example, each of the plurality of cross members may be formed as a closed cross section having a square cross-sectional shape. Parts to be assembled, such as a case support bracket, a battery module mounting bracket, and a reinforcement bracket are assembled to the plurality of cross members, respectively. The parts to be assembled may be bonded to the plurality of cross members, respectively.

According to the related art, while the parts to be assembled are clamped to a welding jig jointly with the cross member, the parts to be assembled may be bonded to an outer surface of the cross member by a laser beam irradiated by a laser welding gun of a welding robot.

However, according to the related art, since each of the plurality of cross members is formed as the closed cross section having the square cross-sectional shape, when the parts to be assembled are laser-welded to the outer surface, the cross member may be thermally deformed by the laser beam.

The thermal deformation causes a gap between the cross member and the part to be assembled, and as a result, the thermal deformation may act as a cause of reducing a laser welding quality of the part to be assembled for the cross member.

The above information disclosed in this Background section is only for enhancement of understanding of the background of the invention, and therefore it may contain information that does not form the prior art that is already known in this country to a person of ordinary skill in the art.

SUMMARY OF THE INVENTION

Exemplary embodiments of the present invention have been made to provide a core for assembling a cross member of a battery case and a core mounting jig which can minimize thermal deformation of a cross member by a laser beam when parts to be assembled of the cross member are bonded to the cross member by laser welding.

An exemplary embodiment of the present invention provides a core for assembling a cross member of a battery case insertable into a closed section in a longitudinal direction of the cross member to laser-weld at least one part to be assembled to the cross member of the battery case with the closed section. The core may include: a first core block made of steel, which includes a first slip surface formed at one side in a width direction to be inclined in a direction toward the other side; a second core block made of the steel, which includes a second slip surface formed to be inclined at the one side in the width direction to slip on the corresponding first slip surface in an upper and lower direction; a plurality of first magnet members installed on one surface of the first core block; and a plurality of second magnet members installed on one surface of the second core block facing the one surface of the first core block.

The first core block may include a slip member coupled to the one surface and having the first slip surface.

The slip member may be fastened to the one surface of the first core block through at least one bolt.

A coupling groove to which the slip member is coupled may be formed on the one surface of the second core block.

The second slip surface may be formed at the coupling groove.

A first pressing surface pressing one surface of the closed section of the cross member may be formed on the other one surface of the first core block.

A second pressing surface pressing the other one surface of the closed section of the cross member may be formed on the other one surface of the second core block.

Each of the plurality of first magnet members may be fitted to the one surface of the first core block and fastened through a first magnet bolt.

Each of the plurality of second magnet members may have a different polarity from each of the plurality of first magnet members and may be fitted to the one surface of the second core block and fastened through a second magnet bolt.

Each of the plurality of first magnet members and each of the plurality of second magnet members may be arranged to be spaced apart from each other in the upper and lower direction.

Locking protrusions may be formed at both ends portions in the longitudinal direction of the first core block and the second core block, respectively.

Another exemplary embodiment of the present invention provides a core mounting jig mounting the core for assembling a cross member on the closed section of the cross member of a battery case. The core mounting jig may include: a core mounting frame; a plurality of member support blocks installed on an upper surface of the core mounting frame in a front and back direction to support the cross member in the longitudinal direction; at least one clamper installed on the upper surface of the core mounting frame and clamping the cross member; and a core support block installed in a front of the core mounting frame to support one end portion in the longitudinal direction of the core fitted into the closed section of the cross member.

Each of the plurality of member support blocks may include one pair of support ribs respectively supporting both surfaces in the width direction of the cross member.

Each of the one pair of support ribs may be provided in a form of becoming thicker from a top to a bottom.

Each of the one pair of support ribs may include a support surface supporting each of the both surfaces in the width direction of the cross member, and a taper surface connecting the top and the support surface.

The at least one clamper may include a locater fixed to the core mounting frame, a clamp handle rotatably installed in the locater and selectively coupled to the locater, a clamp body coupled to the clamp handle, and a clamp block fixed to the clamp body.

The core support block may include a core support roller rotatably coupled to both support bodies facing each other in the width direction, and a first stopper coupled to top portions of both support bodies.

The core mounting jig may further include: a core alignment frame installed to be connected to the core mounting frame; a plurality of core guide blocks installed in a rear of the core mounting frame to support the other one end portion in the longitudinal direction of the core fitted to the closed section of the cross member and installed in the core alignment frame to be spaced apart in the front and back direction to guide the core to be mounted on the closed section of the cross member to the closed section; and a plurality of core alignment blocks installed in the core alignment frame to align a plurality of cores to be mounted on the closed section of the cross member.

Each of the core guide blocks may include a core guide roller rotatably connected to both guide bodies facing each other in the width direction.

A second stopper may be installed in one core guide block corresponding to the other one end portion in the longitudinal direction of the core among the plurality of core guide blocks.

Each of the plurality of core alignment blocks may include both alignment bodies arranged to face each other in the width direction.

Each of the plurality of core alignment blocks may be coupled to one end portion, the other one end portion, and between the one end portion and the other one end portion of the core in the longitudinal direction.

According to the present invention, when a part to be assembled is bonded to cross members by laser welding, thermal deformation of the cross member by a laser beam can be minimized through a core. Therefore, a gap between the cross member and the part to be assembled can be prevented from being caused, and a laser welding quality of the part to be assembled to the cross member can be further enhanced.

Therefore, a gap between the cross member and the part to be assembled can be prevented from being caused, and a laser welding quality of the part to be assembled to the cross member can be further enhanced. That is, various effects predicted according to the exemplary embodiment of the present invention will be disclosed in the detailed description to be described below.

BRIEF DESCRIPTION OF THE DRAWINGS

These drawings are for the purpose of describing an exemplary embodiment of the present invention, and therefore the technical spirit of the present invention should not be construed as being limited to the accompanying drawings.

It should be understood that the referenced drawings are not particularly illustrated according to a scale, present a brief expression of various preferred features illustrating a basic principle of the present invention. For example, specific design features of the present invention, which include a specific dimension, a specific direction, a specific position, and a specific shape will be partially determined according to a specific intended application and a specific use environment.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Terms used herein are used only for a purpose of describing specific exemplary embodiments and are not intended to limit the present disclosure. As used herein, singular forms are also intended to include plural forms unless explicitly displayed in terms of a context.

It should also be understood that the term 'include' and/or 'including' used herein shows the presence of the specified features, integers, steps, operations, elements and/or components, but it the presence or addition of one or more other features, integers, steps, operations, components, and/or groups thereof is not excluded. As used herein, the term 'and/or' include one or all random combinations of one or more items which are associated and listed.

The term 'coupled' herein represents a physical relationship between two components directly connected to each other by welding, self-piercing rivet (SPR), flow drill screw (FDS), structural adhesive, etc., or indirectly connected through one or more parameters components.

As used here, 'vehicle', 'vehicular', 'car' or other similar terms used herein generally include passenger automobiles including passenger vehicles, sports utility vehicles (SUVs), buses, trucks, and various commercial vehicles, and include hybrid vehicles, electric vehicles, hybrid electric vehicles, electric vehicle-based purpose-built vehicle (PBV) vehicles, hydrogen power vehicles and other alternative fuel vehicles (e.g., fuel induced from resources other than petroleum).

Hereinafter, exemplary embodiments of the present invention will be described in detail with reference to the accompanying drawings.

Figure 1:
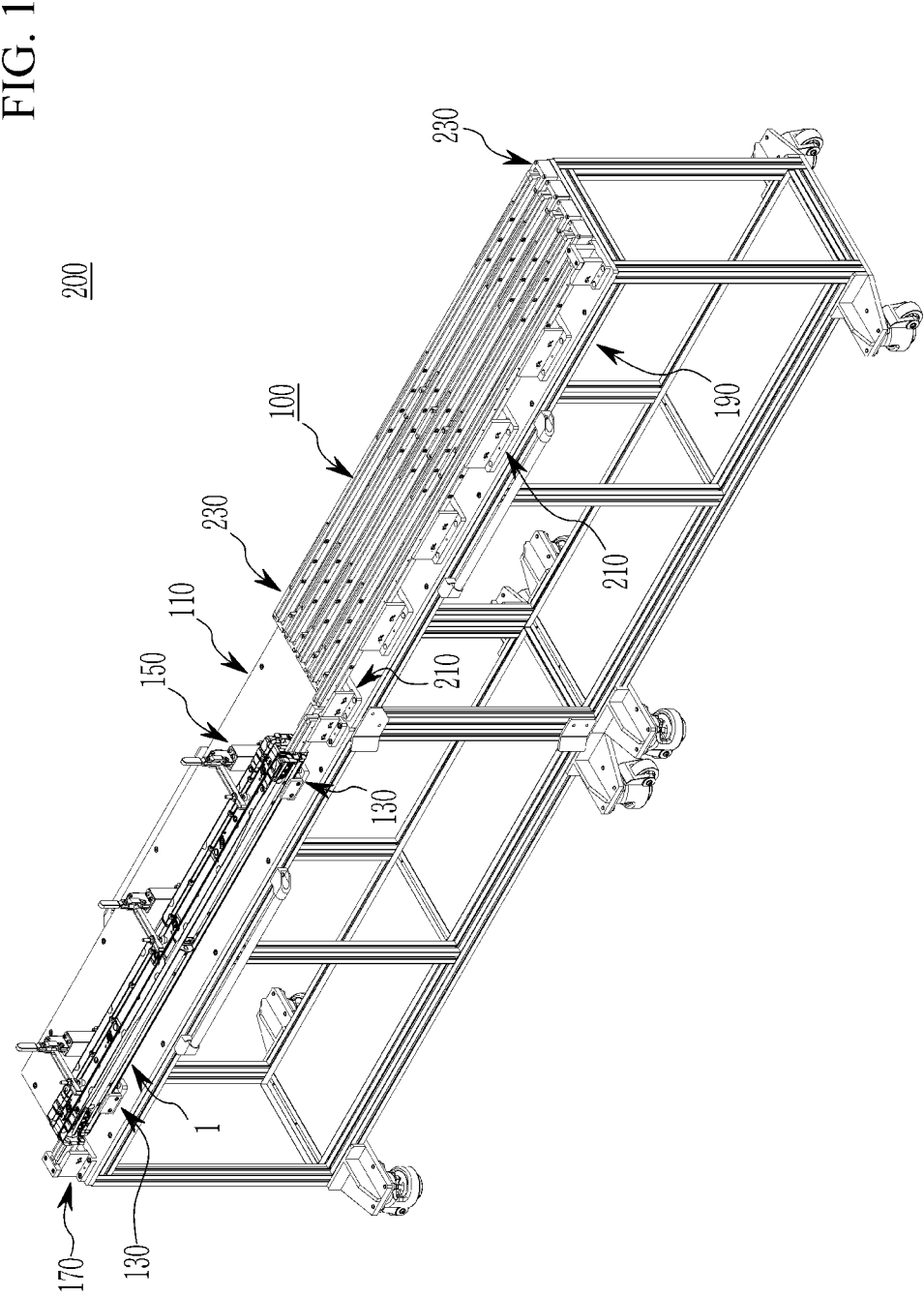
FIG. 1 is a perspective view illustrating a core for assembling a cross member of a battery case and a core mounting jig according to an exemplary embodiment of the present invention.

FIG. 1 is a perspective view illustrating a core for assembling a cross member of a battery case and a core mounting jig according to an exemplary embodiment of the present invention.

Referring to FIG. 1, the core 100 for assembling a cross member of a battery case and the core mounting jig 200 according to the exemplary embodiment of the present invention may be applied to a process of assembling a battery case (not illustrated) of a battery pack (not illustrated) mounted on an electric vehicle. Furthermore, the core 100 for assembling a cross member of a battery case and the core mounting jig 200 according to the exemplary embodiment of the present invention may be applied to a process of assembling a plurality of cross members 1 mounted on the battery case (not illustrated).

Figure 2:
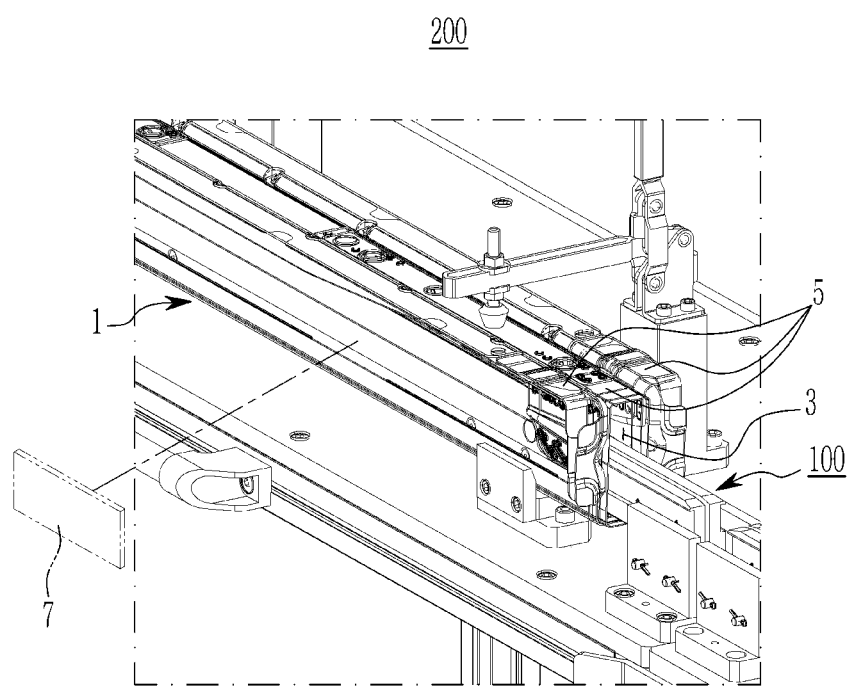
FIG. 2 is a view illustrating an example of the cross member applied to the core for assembling a cross member of a battery case and the core mounting jig according to an exemplary embodiment of the present invention.

The plurality of cross members 1 is configured to support and fix a plurality of battery modules (not illustrated) stored in the battery case. In one example, each of the plurality of cross members 1 includes a closed section 3 having a substantially square cross-sectional shape as illustrated in FIG. 2.

Here, at least one bracket 5 including a battery module mounting bracket and a reinforcement bracket is bonded to each of the plurality of cross members 1, and at least one part 7 to be assembled may be assembled (e.g., bonded or welded) in addition to at least one bracket 5.

Furthermore, the core 100 for assembling a cross member of a battery case and the core mounting jig 200 according to the exemplary embodiment of the present invention may be applied to a welding assembly process of laser-welding at least one part 7 to be assembled to each of the plurality of cross members 1 by irradiating a laser beam to a bonding portion of each of the plurality of cross members 1 and at least one part 7 to be assembled.

In the exemplary embodiment of the present invention, it is described that the part 7 to be assembled is laser-welded to the cross member 1 mounted on the battery case. However, although not particularly limited thereto, if a part to be assembled such as a bracket is laser-welded to a base material having a closed cross section with a set shape, the technical idea of the present invention may be applied.

In the present invention, an example in which components are mounted will be described based on a front and back direction.

Furthermore, in the present invention, a 'top portion', 'upper portion', 'top' or 'upper surface' of the component represents an end portion, portion, end, or surface of the component relatively above in the figure and a 'bottom portion', lower portion', 'bottom', or 'lower surface' of the component. 'Lower ends', 'lower parts', 'bottom' or 'lower surface' represents, an end portion, portion, end, or surface relatively below in the figure.

Furthermore, in the present invention, the end (e.g., one end or the other one end) of the component represents the end of the component in a predetermined direction and the end portion (e.g., one end portion or the other one end portion) of the component represents a predetermined portion of the component, which includes the end.

The core 100 for assembling a cross member of a battery case and the core mounting jig 200 according to the exemplary embodiment of the present invention are formed in a structure in which when at least one part 7 to be assembled is bonded to each of the plurality of cross members 1 by laser welding, thermal deformation of the cross members 1 by the laser beam may be minimized.

To this end, the core 100 for assembling a cross member of a battery case according to the exemplary embodiment of the present invention is configured to be inserted into the closed section 3 of each of the plurality of cross members 1 in a longitudinal direction of each of the plurality of cross members 1.

Figure 3:
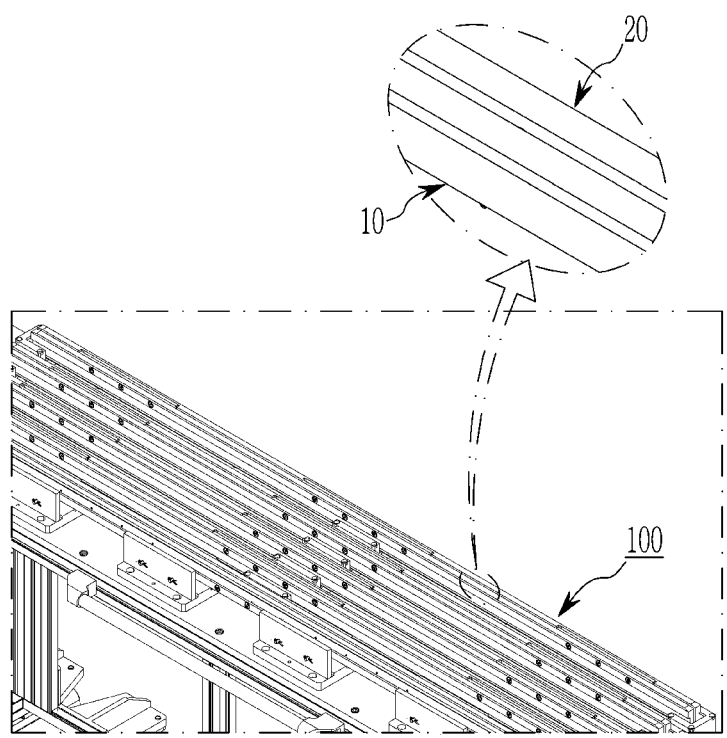
FIG. 3 is a coupling perspective view illustrating the core for assembling a cross member of a battery case according to an exemplary embodiment of the present invention.
Figure 4:
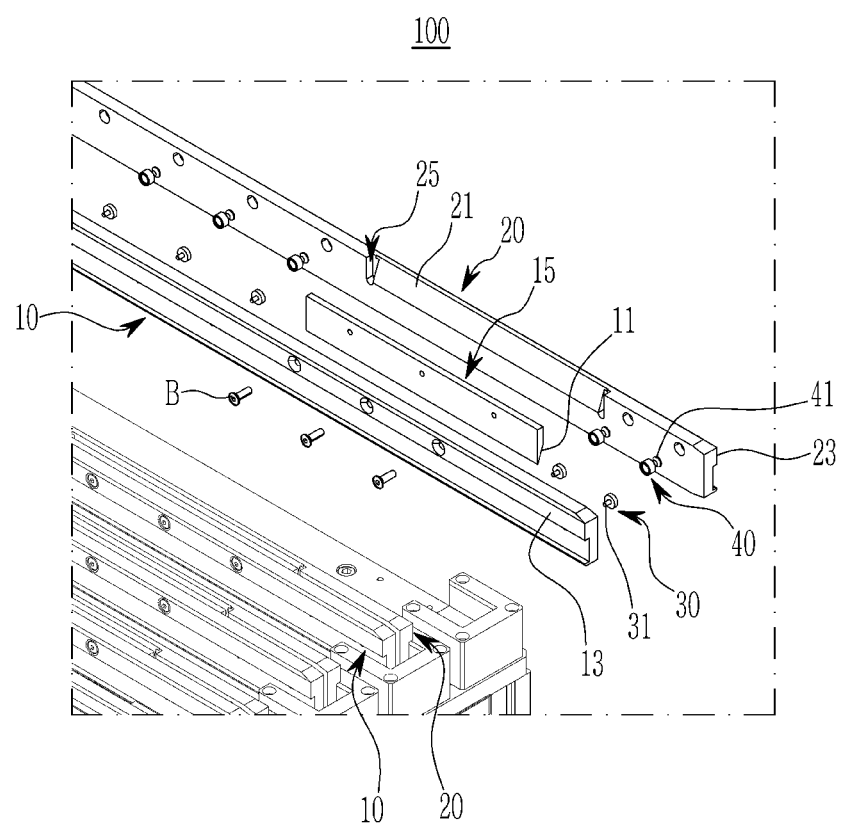
FIG. 4 is a partial exploded perspective view illustrating the core for assembling a cross member of a battery case according to an exemplary embodiment of the present invention.
Figure 5:
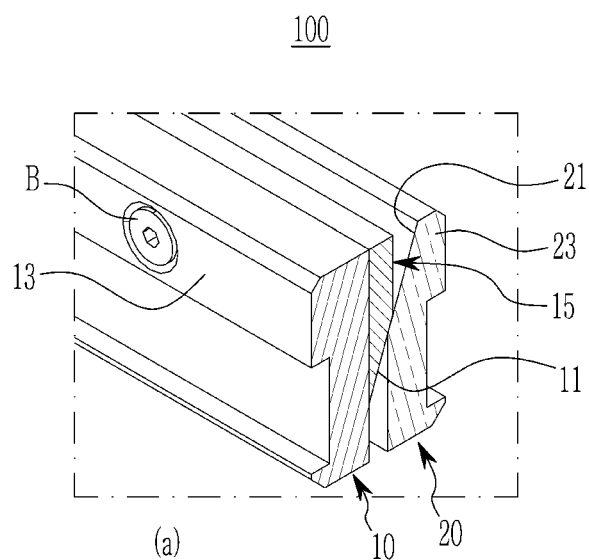
FIG. 5 is a coupling perspective view illustrating the core for assembling a cross member of a battery case according to an exemplary embodiment of the present invention.
Figure 5:
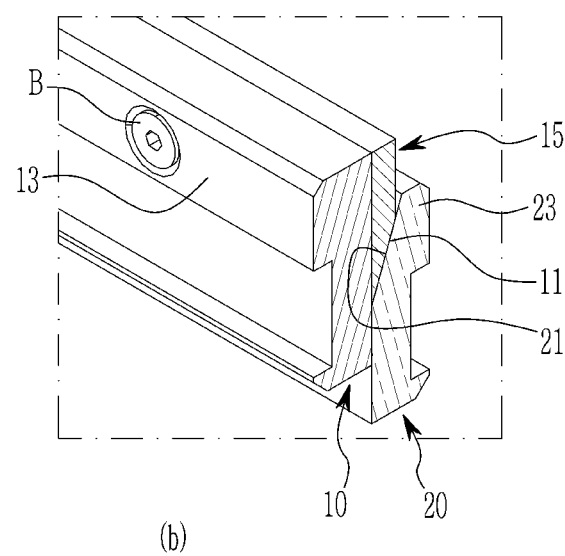

FIG. 3 is a coupling perspective view illustrating the core for assembling a cross member of a battery case according to an exemplary embodiment of the present invention, FIG. 4 is a partial exploded perspective view illustrating the core for assembling a cross member of a battery case according to an exemplary embodiment of the present invention, and FIG. 5 is a coupling perspective view illustrating the core for assembling a cross member of a battery case according to an exemplary embodiment of the present invention.

Referring to FIGS. 1 to 5, the core 100 for assembling a cross member of a battery case according to the exemplary embodiment of the present invention basically includes a first core block 10, a second core block 20, a plurality of first magnet members 30, and a plurality of second magnet members 40.

In the exemplary embodiment of the present invention, the first core block 10 is made of a steel material. The first core block 10 includes a slip surface 11 formed to be inclined in the other one direction at one side in a width direction.

A first pressing surface 13 pressing one surface of an inside (e.g., the closed section 3) of each of the plurality of cross members 1 is formed on the other surface of the first core block 10.

Furthermore, the first core block 10 further includes a slip member 15 coupled to the one surface. The slip member 15 is formed on the first slip surface 11 mentioned above in an upper and lower direction.

Here, the slip member 15 is fastened to the first core block 10 through a plurality of bolts B. In addition, first locking protrusions 17 (see FIGS. 9 and 10) are formed at both end portions in the longitudinal direction of the first core block 10.

In the exemplary embodiment of the present invention, the second core block 20 is made of the steel material. The second core block 20 includes a second slip surface 21 formed to be inclined at one side in the width direction to slip on the first slip surface 11 of the corresponding first core block 10 in the upper and lower direction.

A second pressing surface 23 pressing the other one surface of the inside (e.g., the closed section 3) of each of the plurality of cross members 1 is formed on the other one surface of the second core block 20.

A coupling groove 25 to which a slip member 15 is coupled is formed on one surface of the second core block 20 to slip on the first slip surface 11 of the first core block 10 in the upper and lower direction.

Here, a second slip surface 21 which is enabled to slip on the first slip surface 11 of the slip member 15 in the upper and lower direction is formed at the coupling groove 25. In addition, second locking protrusions 29 (see FIGS. 9 and 20) are formed at both end portions in the longitudinal direction of the second core block 20.

In the exemplary embodiment of the present invention, the plurality of first magnet members 30 and the plurality of second magnet members 40 couple surfaces of the first core block 10 and the second core block, which face each other.

Each of the plurality of first magnet member 30 is installed on one surface of the first core block 10. Each of the plurality of first magnet members 30 may be fitted to one surface of the first core block 10 and fastened to one surface of the first core block 10 through a first magnet bolt 31.

In addition, each of the plurality of second magnet member 40 is installed on one surface of the second core block 20, which faces one surface of the first core block 10. Each of the plurality of second magnet members 40 may show a different polarity from each of the plurality of first magnet members 30. Each of the plurality of second magnet members 40 may be fitted to one surface of the second core block 20 and fastened to one surface of the second core block 20 through a second magnet bolt 41.

Here, each of the plurality first magnet members 30 installed on one surface of the first core block 10 and each of the plurality of second magnet members 40 installed on one surface of the second core block 20 may be arranged to be spaced apart from each other in the upper and lower direction.

Meanwhile, referring to FIG. 1, the core mounting jig 200 according to the exemplary embodiment of the present invention mounts the core 100 on the closed section 3 (see FIG. 2) of each of the plurality of cross members 1.

The core mounting jig 200 according to the exemplary embodiment of the present invention basically includes a core mounting frame 110, a plurality of member support blocks 130, at least one clamper 150, a corer support block 170, a core alignment frame 190, a plurality of core guide blocks 210, and a plurality of core alignment blocks 230.

Figure 6:
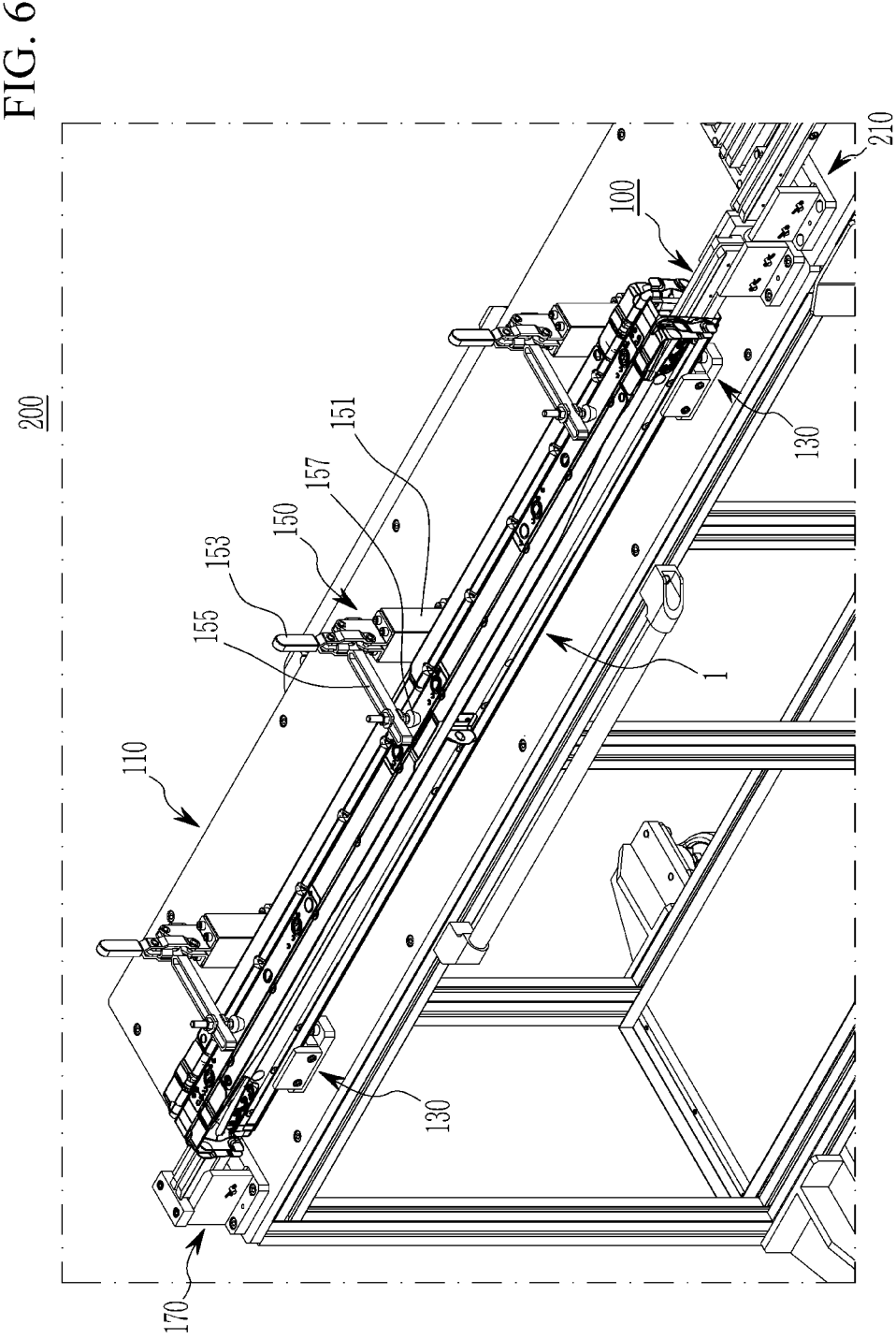
FIGS. 6 and 7 are views illustrating the core mounting jig according to an exemplary embodiment of the present invention.
Figure 7:
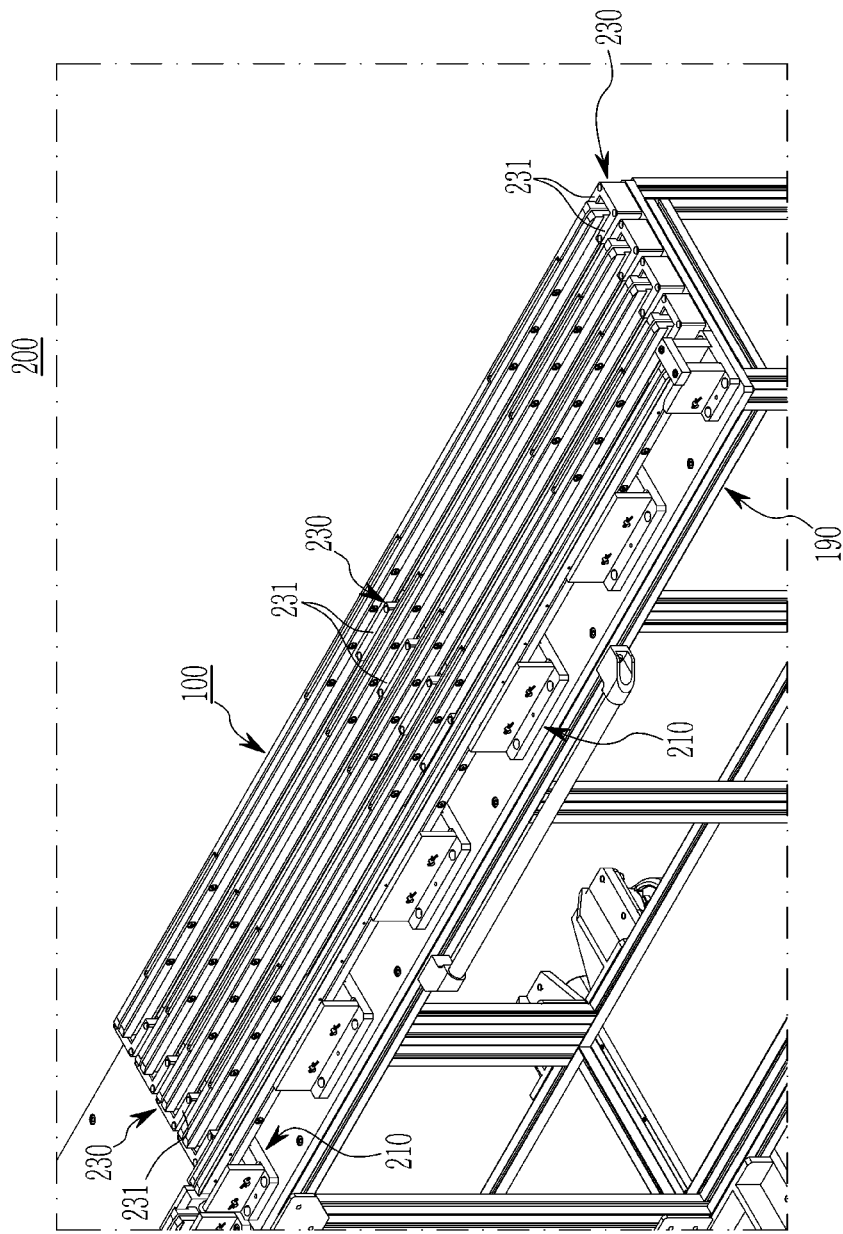
Figure 8:
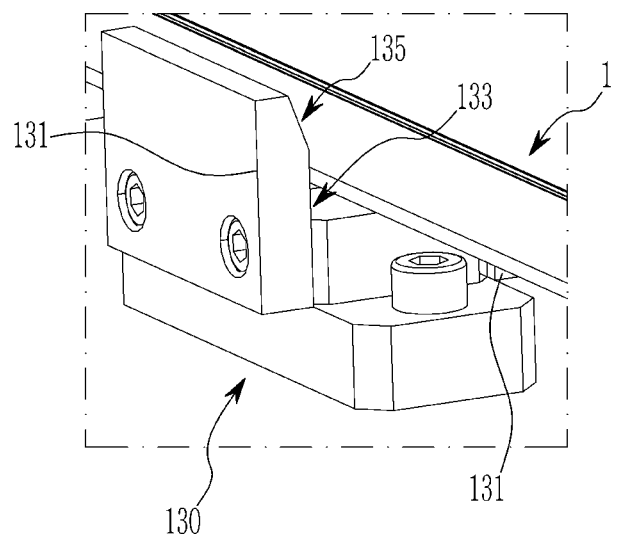
FIG. 8 is a view illustrating a member support block applied to the core mounting jig according to an exemplary embodiment of the present invention.

FIGS. 6 and 7 are views illustrating the core mounting jig according to an exemplary embodiment of the present invention.

Referring to FIGS. 6 and 7, in the exemplary embodiment of the present invention, the core mounting frame 110 is installed on a floor surface of a process worksite. The core mounting frame 110 are configured to mount various components to be described below. The core mounting frame 110 may be constituted one frame or two or more partitioned frames.

The core mounting frame 110 may include various accessory elements such as a bracket, a bar, a rod, a plate, a housing, a case, a block, a partition, and a rib configured to support respective components.

However, since the various accessory elements are configured to mount the respective components to be described below on the core mounting frame 110, the various accessory elements are collectively referred to as the core mounting frame 110 except for an exceptional case in the exemplary embodiment of the present invention.

In the exemplary embodiment of the present invention, the plurality of member support blocks 130 supports one of the plurality of cross members 1 in the longitudinal direction. The plurality of member support blocks 130 is installed on an upper surface of the core mounting frame 110 in the longitudinal direction.

Each of the plurality of member support blocks 130 includes a pair of support ribs 131 supporting both surfaces of the cross member 1 in the width direction. Each of the plurality of member support blocks 130 may be provided in a form of being gradually thicker from the top to a lower side.

Here, each of the one pair of support ribs 131 includes a support surface 133 supporting each of both surfaces of the cross member 1 in the width direction and a taper surface 135 connecting the top and the support surface 133.

In the exemplary embodiment of the present invention, the at least one clamper 150 is configured to clamp the cross members 1 supported on the plurality of members support blocks 130. The at least one clamper 150 may be installed on the upper surface of the core mounting frame 110.

The at least one clamper 150 includes a locater 151, a clamp handle 153, a clamp body 155, and a clamp block 157.

The locater 151 is fixed to the upper surface of the core mounting frame 110. The clamp handle 153 is rotatably installed in the locater 151, and selectively coupled to the locater 151.

The clamp body 155 is coupled to the clamp handle 153 to rotate in the upper and lower direction jointly with the clamp handle 153. In addition, the clamp block 157 presses (e.g., clamps) the upper surface of the cross member 1. The clamp block 157 is provided as a rubber block type and is fixed to an end portion of the clamp body 155, in one example.

Since the at least one clamper 150 is configured by a toggle clamper well known to those skilled in the art, a more detailed description of the component will be described in the present invention.

In the exemplary embodiment of the preset invention, the core support block 170 supports one end portion in the longitudinal direction of the core 100 fitted to the closed section 3 of the cross member 1. The core support block 170 is installed in a front (e.g., one side in the longitudinal direction0 of the core mounting frame 110 to correspond to one end portion in the longitudinal direction of the core 100.

Figure 9:
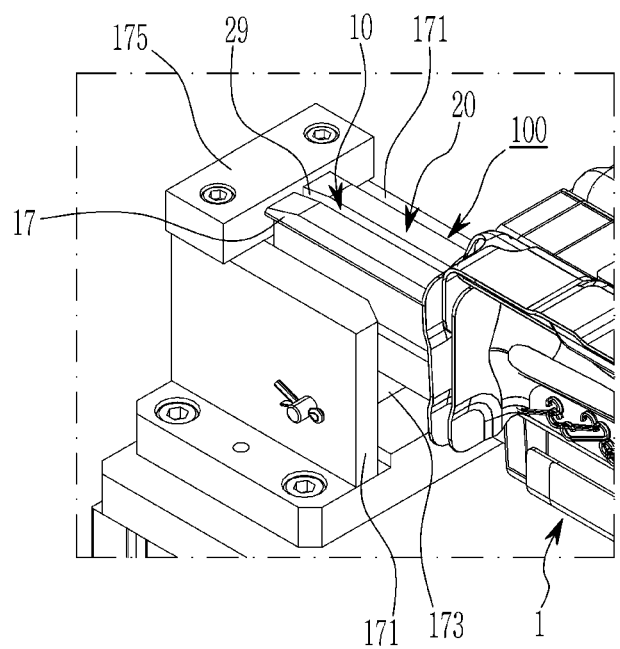
FIG. 9 is a view illustrating a core support block applied to the core mounting jig according to an exemplary embodiment of the present invention.

As illustrated in FIG. 9, the core support block 170 includes a core support block 173 rotatably coupled to both support bodies 171 facing each other and a first stopper 175 coupled to the top portion of both support bodies 171.

The core support block 173 is provided to rollably contact one end portion in the longitudinal direction of the core 100 fitted to the closed section 3 of the cross member 1. The first stopper 175 supports a first locking protrusion 17 and a second locking protrusion 29 formed at one end portion in the longitudinal direction of each of the first core block 10 and the second core block 20.

In the exemplary embodiment of the present invention, the core alignment frame 190 is installed on the floor surface of the process worksite and is connected to the core mounting frame 110 in the front and back direction (longitudinal direction). The core alignment frame 190 is configured to mount various components to be described below. The core alignment frame 190 may be constituted one frame or two or more partitioned frames.

The core alignment frame 190 may include various accessory elements such as the bracket, the bar, the rod, the plate, the housing, the case, the block, the partition, and the rib configured to support respective components.

However, since the various accessory elements are configured to mount the respective components to be described below on the core alignment frame 190, the various accessory elements are collectively referred to as the core alignment frame 190 except for an exceptional case in the exemplary embodiment of the present invention.

In the exemplary embodiment of the present invention, the plurality of core guide blocks 210 is installed in a rear (the other side in the longitudinal direction) of the core mounting frame 110 to support the other one end portion in the longitudinal direction of the core 100 fitted to the closed section 3 of the cross member 1 and installed spaced part from the core alignment frame 190 in the front and back direction to guide the core 100 to be mounted on the closed section 3 of the cross member 1 to the closed section 3.

Figure 10:
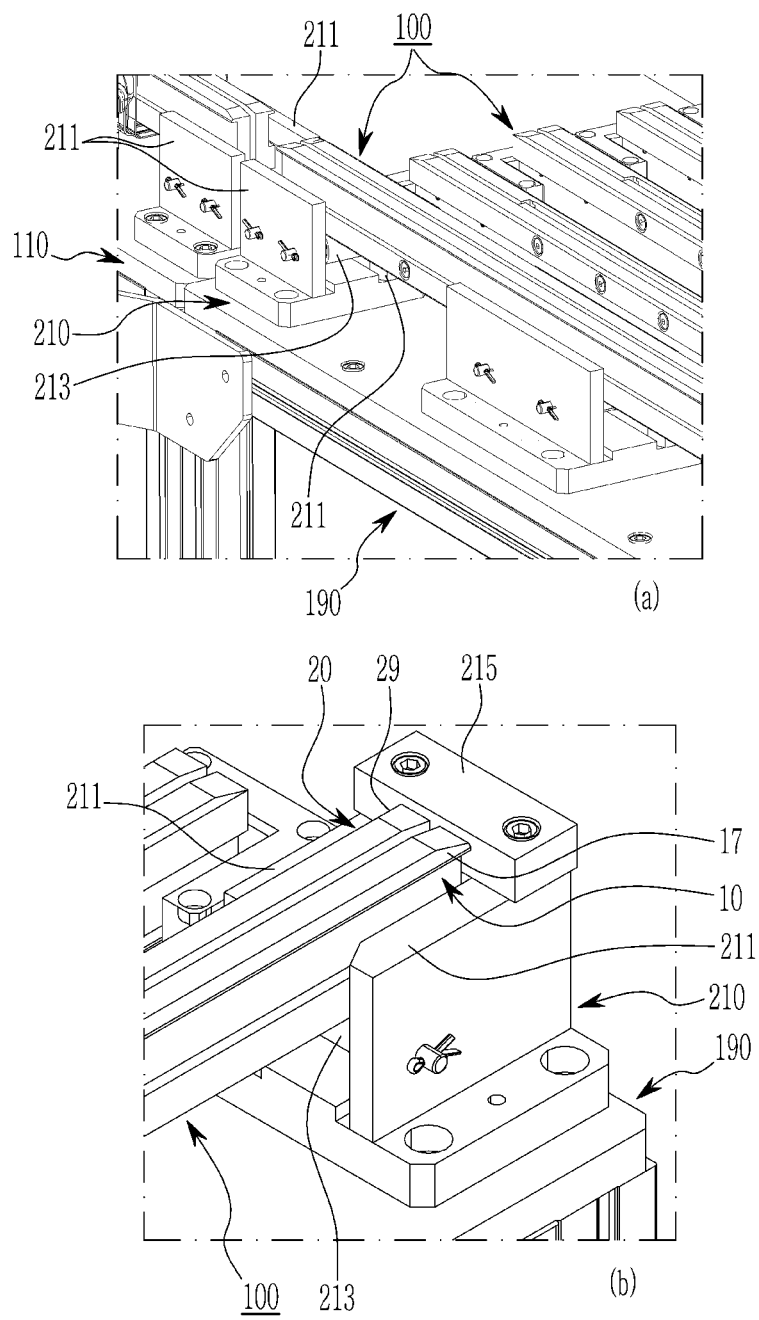
FIG. 10 is a view illustrating a core guide block applied to the core mounting jig according to an exemplary embodiment of the present invention.

As illustrated in FIG. 10, each of the plurality of core guide blocks 210 includes a core guide roller 213 rotatably connected to both guide bodies 211 facing each other in the width direction.

The core guide block 213 is provided to rollably contact the lower portion of the core 100.

Furthermore, among the plurality of core guide blocks 210, a second stopper 215 is installed in one core guide block 210 corresponding to the other one end portion in the longitudinal direction of the core 100. The second stopper 215 supports a first locking protrusion 17 and a second locking protrusion 29 formed at the other one end portion in the longitudinal direction of each of the first core block 10 and the second core block 20.

In the exemplary embodiment of the present invention, the plurality of core alignment blocks 230 aligns the plurality of cores 100 to be mounted on the closed section 3 of the cross members 1 in the longitudinal direction. The plurality of core alignment blocks 230 is installed on the upper surface of the core alignment frame 190.

Figure 11:
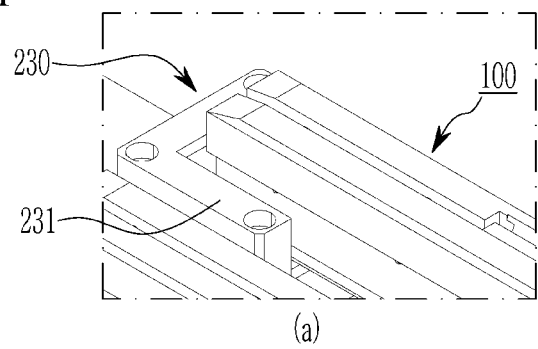
FIG. 11 is a view illustrating a core alignment block applied to the core mounting jig according to an exemplary embodiment of the present invention.
Figure 11:
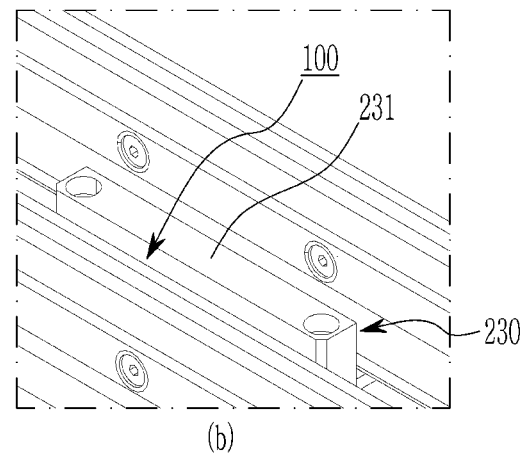
Figure 11:
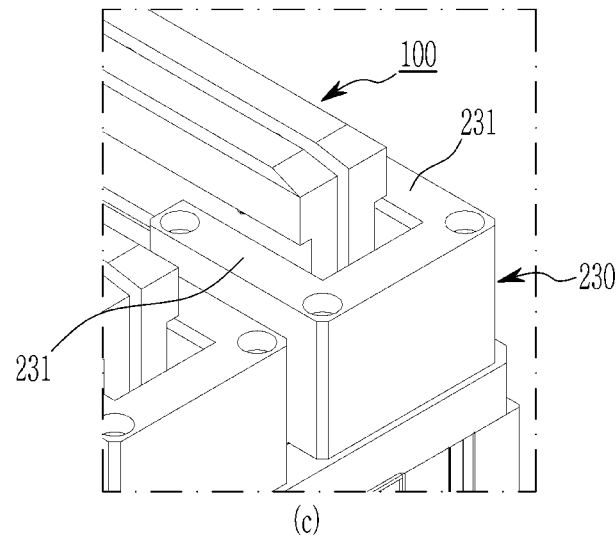

Each of the plurality of core alignment blocks 230 includes both alignment bodies 231 arranged to face each other in the width direction as illustrated in FIG. 11. Each of the plurality of core alignment blocks 230 may be coupled to one end portion, the other one end portion, and between one end portion and the other one end portion of the core 100 in the longitudinal direction.

Hereinafter, actions of the core 100 for assembling the cross member of the battery case and the core mounting jig 200 according to the exemplary embodiment of the present invention configured as such will be described in detail with reference to FIGS. 1 to 11.

First, in the exemplary embodiments, a plurality of cores 100 is provided. The plurality of cores 100 is aligned by a plurality of core alignment blocks 230 in the core mounting jig 200.

Here, a first core block 10 and a second core block of each of the plurality of cores 100 are coupled to each other by a plurality of first magnet members 30 and a plurality of second magnet member 40.

Furthermore, the first core block 10 is disposed above the second core block 20 in a state of being coupled to the second core block 20 by the plurality of first magnet members 30 and the plurality of second magnet members 40 while a first slip surface 11 of a slip member 15 is located at the upper portion of a second slip 21 of the second core block 20.

Meanwhile, in the exemplary embodiment of the present invention, one of a plurality of cross members 1 is located in a plurality of member support blocks 130.

In this case, the one cross member 1 is placed between one pair of support ribs 131 of each of the plurality of member support blocks 130 and inserted between one pair of support ribs 131 through taper surface 135 of the one pair of support ribs 131. Here, the one cross member 1 is in a state in which both surfaces are in close contact with the support surfaces 133 of one support ribs 131 in the longitudinal direction.

Next, in the exemplary embodiment of the present invention, the clamp handle 153 of at least one clamper 150 is rotated in an upper direction. Then, the clamp body 155 is rotated in a lower direction through the clamp handle 153, and the clamp block 157 presses the upper surface of the cross member 1 and clamps the cross member 1 through the clamp body 155.

In such a state, in the exemplary embodiment of the present invention, one of the plurality of cores 100 aligned in the plurality of core alignment blocks 230 is located in the plurality of core guide blocks 210 on the core alignment frame 190. The one core 100 is disposed on the core guide roller 213 between both guide bodies 211 in the longitudinal direction of each of the plurality of core guide blocks 210.

In this case, the second stopper 215 of the core guide block 210 located at a rearmost side stops the first locking protrusion 17 and the second locking protrusion 29 formed at the other one end portion in the longitudinal direction of each of the first core block 10 and the second core block 20 of the one core 100. In addition, the one core 100 is located on the same line as the closed section 3 of the cross member 1 while being supported by the plurality of core guide blocks 210.

Then, in the exemplary embodiment of the present invention, one core 100 located in the plurality of core guide blocks 210 is pushed and the one core 100 is moved to a front side (one side in the longitudinal direction0 of the core mounting frame 110 through the core guide block 213 of the plurality of core guide blocks 210.

As a result, the one core 100 is inserted into the closed section 3 of the cross member 1 through the plurality of core guide blocks 210, and one end portion in the longitudinal direction of the one core 100 is located between both support bodies 171 in the width direction through the core support roller 173 of the core support block 170.

Here, the first stopper 175 of the core support block 170 stops the first locking protrusion 17 and the second locking protrusion 29 formed at one end portion in the longitudinal direction of each of the first core block 10 and the second core block 20 of the one core 100.

In addition, the other one end portion is located in the core guide block 210 installed in a rear of the core mounting frame 110 in the longitudinal direction of each of the first core block 10 and the second core block 20.

While one core 100 is inserted into the closed section 3 of the cross member 1 as described above, the clamp handle 153 of at least one clamper 150 is rotated in the lower direction in the exemplary embodiment of the present invention. Then, the clamp body 155 is rotated in the upper direction through the clamp handle 153, and the clamp block 157 is separated from the upper surface of the cross member 1 and releases clamping of the cross member 1 through the clamp body 155.

Then, in the exemplary embodiment of the present invention, the cross member 1 into which the one core 100 is inserted is moved to a welding jig (not illustrated) and fixed to the welding jig.

Next, when both end portions of one core 100 are pressed in the lower direction in the welding jig, the first core block 10 is moved away from the second core block 20 while the first slip surface 11 of the slip member 15 slips in the lower direction along the second slip surface 21 of the second core block 20.

As a result, the first core block 10 presses one surface inside the closed section 3 of the cross member 1 through the first pressing surface 13 and presses the other one surface inside the closed section 3 of the cross member 1 through the second pressing surface 23.

Then, in the exemplary embodiment of the present invention, when the laser beam is irradiated to the bonding portion of the part 7 to be assembled through a laser welding gun (not illustrated) of a welding robot (not illustrated) while the part 7 to be assembled is in close contact with both external surfaces or one external surface, the part 7 to be assembled may be laser-welded to both external surfaces or one external surface of the cross member 1.

According to the exemplary embodiment of the present invention described up to now, the core 100 may be inserted into the closed section 3 of the cross member 1 and both surfaces inside the closed section 3 of the cross member 1 may be pressed through the core 100.

Accordingly, in the exemplary embodiment of the present invention, when part 7 to be assembled is bonded to the cross members 1 by the laser welding, the thermal deformation of the cross member 1 by the laser beam may be minimized through the core 100.

As a result, in the exemplary embodiment of the present invention, a gap between the cross member 1 and the part 7 to be assembled can be prevented from being caused, and a laser welding quality of the part 7 to be assembled to the cross member 1 can be further enhanced.

Although the preferred implementation examples, the examples, and the implementation examples of the present invention are described through the above description, but the present invention is not limited thereto and various modifications can be made within the claims and the range of the detailed description and the accompanying drawings of the invention, and this also belongs to the scope of the present invention, of course.

<Description of symbols>

| | |
|---|---|
| 1: Cross member | 3: Closed section |
| 5: Bracket | 7: Par to be assembled |
| 10: First core block | 11: First slip surface |
| 13: First pressing surface | 15: Slip member |
| 17: First locking protrusion | 20: Second core block |
| 21: Second slip surface | 23: Second pressing surface |
| 25: Coupling groove | 29: Second locking protrusion |
| 30: First magnet member | 31: First magnet bolt |
| 40: Second magnet member | 41: Second magnet bolt |
| 100: Core | 110: Core mounting frame |
| 130: Member support block | 131: Support rib |
| 133: Support surface | 135: Taper surface |
| 150: Clamper | 151: Locater |
| 153: Clamp handle | 155: Clamp body |
| 157: Clamp block | 170: Core support block |
| 171: Support body | 173: Core support roller |
| 175: First stopper | 190: Core alignment frame |
| 200: Core mount jig | 210: Core guide block |
| 211: Guide body | 213: Core guide roller |
| 215: second stopper | 230: Core alignment block |
| 231: Alignment body | B: Bolt |

What is claimed is:

1. A core for assembling a cross member of a battery case insertable into a closed section in a longitudinal direction of the cross member to laser-weld at least one part to be assembled to the cross member of the battery case with the closed section, comprising:
    a first core block including a first slip surface formed at one side in a width direction to be inclined in a direction toward another side;
    a second core block including a second slip surface formed to be inclined at the one side in the width direction to slip on the first slip surface in an upper and lower direction;
    a plurality of first magnet members installed on one surface of the first core block; and
    a plurality of second magnet members installed on one surface of the second core block facing the one surface of the first core block.

2. The core of claim 1, wherein:
the first core block includes a slip member coupled to the one surface and having the first slip surface.

3. The core of claim 2, wherein:
the slip member is fastened to the one surface of the first core block through at least one bolt.

4. The core of claim 3, wherein:
a coupling groove to which the slip member is coupled is formed on the one surface of the second core block, and the second slip surface is formed at the coupling groove.

5. The core of claim 1, wherein:
a first pressing surface, pressing one surface of the closed section of the cross member, is formed on another one surface of the first core block, and
a second pressing surface pressing another one surface of the closed section of the cross member is formed on another one surface of the second core block.

6. The core of claim 1, wherein:
each of the plurality of first magnet members is fitted to the one surface of the first core block and fastened through a first magnet bolt, and
each of the plurality of second magnet members has a different polarity from each of the plurality of first magnet members and is fitted to the one surface of the second core block and fastened through a second magnet bolt.

7. The core of claim 6, wherein:
each of the plurality of first magnet members and each of the plurality of second magnet members are arranged to be spaced apart from each other in the upper and lower direction.

8. The core of claim 1, wherein:
locking protrusions are formed at ends portions in a longitudinal direction of the first core block and the second core block, respectively.

9. A core mounting jig mounting the core for assembling a cross member of claim 1 on the closed section of the cross member of a battery case, comprising:
    a core mount frame;
    a plurality of member support blocks installed on an upper surface of the core mount frame in a front and back direction to support the cross member in the longitudinal direction;
    at least one clamper installed on the upper surface of the core mount frame and clamping the cross member; and
    a core support block installed in a front of the core mount frame to support one end portion in a longitudinal direction of the core fitted into the closed section of the cross member.

10. The core mounting jig of claim 9, wherein:
each of the plurality of member support blocks includes one pair of support ribs respectively supporting both surfaces in a width direction of the cross member.

11. The core mounting jig of claim 10, wherein:
each of the one pair of support ribs is provided in a form of becoming thicker from a top to a bottom.

12. The core mounting jig of claim 11, wherein each of the one pair of support ribs includes:

a support surface supporting each of the both surfaces in the width direction of the cross member, and a taper surface connecting the top and the support surface.

13. The core mounting jig of claim 9, wherein the at least one clamper includes:

a locater fixed to the core mount frame, a clamp handle rotatably installed in the locater and selectively coupled to the locater, a clamp body coupled to the clamp handle, and a clamp block fixed to the clamp body.

14. The core mounting jig of claim 9, wherein the core support block includes:

a core support roller rotatably coupled to support bodies facing each other in a width direction, and a first stopper coupled to top portions of the both support bodies.

15. The core mounting jig of claim 9, further comprising:

a core alignment frame installed to be connected to the core mount frame;

a plurality of core guide blocks installed in a rear of the core mount frame to support another one end portion in a longitudinal direction of the core fitted into the closed section of the cross member and installed in the core alignment frame to be spaced apart in the front and back direction to guide the core to be mounted on the closed section of the cross member to the closed section; and a plurality of core alignment blocks installed in the core alignment frame to align a plurality of cores to be mounted on the closed section of the cross member.

16. The core mounting jig of claim 15, wherein:

each of the core guide blocks includes a core guide roller rotatably connected to guide bodies facing each other in a width direction.

17. The core mounting jig of claim 16, wherein:

a stopper is installed in one core guide block corresponding to another one end portion in a longitudinal direction of the core among the plurality of core guide blocks.

18. The core mounting jig of claim 15, wherein:

each of the plurality of core alignment blocks includes alignment bodies arranged to face each other in a width direction.

19. The core mounting jig of claim 17, wherein:

each of the plurality of core alignment blocks is coupled to one end portion, the other one end portion, and between the one end portion and the other one end portion of the core in the longitudinal direction.

* * * * *